US012781753B2

(12) United States Patent
Lechler et al.

(10) Patent No.: US 12,781,753 B2
(45) Date of Patent: Nov. 3, 2026

(54) FAN WHEEL

(71) Applicant: IE ASSETS GMBH & CO. KG, Schorndorf (DE)

(72) Inventors: Markus Lechler, Schorndorf (DE); Samuel Arnold, Schorndorf (DE)

(73) Assignee: IE ASSETS GMBH & CO. KG, Schorndorf (DE)

( * ) Notice: Subject to any disclaimer, the term of this patent is extended or adjusted under 35 U.S.C. 154(b) by 0 days.

(21) Appl. No.: 19/223,280

(22) Filed: May 30, 2025

(65) Prior Publication Data

US 2025/0290519 A1 Sep. 18, 2025

Related U.S. Application Data

(63) Continuation-in-part of application No. PCT/EP2024/025193, filed on Jul. 1, 2024.

(30) Foreign Application Priority Data

Jul. 20, 2023 (DE) ........................ 10 2023 119 250

(51) Int. Cl.
*F04D 25/02* (2006.01)
*F04D 19/00* (2006.01)
(Continued)

(52) U.S. Cl.
CPC ......... *F04D 25/028* (2013.01); *F04D 19/002* (2013.01); *F04D 29/36* (2013.01); *F16H 1/28* (2013.01); *F16H 31/001* (2013.01)

(58) Field of Classification Search
CPC ...... F04D 29/329; F04D 29/36; F04D 19/002; F04D 25/028; F04D 29/362; F04D 19/005; F04D 27/00; F04D 29/366; F04D 25/06; F04D 29/364; F04D 29/703; F04D 25/022; F05D 2260/74; F05D 2260/40311;
(Continued)

(56) References Cited

U.S. PATENT DOCUMENTS

2021/0003141 A1 1/2021 Haegele et al.
2021/0164355 A1* 6/2021 Haegele ................ F04D 19/005
(Continued)

FOREIGN PATENT DOCUMENTS

DE 10 2012 015 358 A1 2/2014
DE 10 2018 106 454 A1 9/2019
DE 10 2018 114 534 A1 12/2019

OTHER PUBLICATIONS

The International Search Report In the German language for the corresponding International Patent Application No. PCT/EP2024/025193 (2 pages); dated Sep. 20, 2024.
(Continued)

*Primary Examiner* — Eric J Zamora Alvarez
(74) *Attorney, Agent, or Firm* — Ronald S. Lombard

(57) ABSTRACT

A fan wheel with fan blades which are supported in a hub so as to be pivotable about the longitudinal fan blade axes, with the fan wheel including a drive flange which is connected to the hub via a limited free-wheeling structure, is provided with a planetary transmission arranged between the drive flange and the fan blades. A sun gear of the planetary transmission which is connected to the drive flange for rotation therewith and the drive flange are arranged at axially opposite front sides of the fan wheel.

13 Claims, 4 Drawing Sheets

(51) Int. Cl.
*F04D 29/32* (2006.01)
*F04D 29/36* (2006.01)
*F04D 29/70* (2006.01)
*F16H 1/28* (2006.01)
*F16H 31/00* (2006.01)

(58) Field of Classification Search
CPC .. F05D 2260/76; F05D 2260/607; F01D 7/00; F01D 7/02; B64C 11/32; F16H 1/28; F16H 31/001; F05B 2260/74
See application file for complete search history.

(56) References Cited

U.S. PATENT DOCUMENTS

| | | | | |
|---|---|---|---|---|
| 2022/0099098 | A1* | 3/2022 | Haegele | F04D 29/36 |
| 2023/0304503 | A1* | 9/2023 | Haegele | F04D 29/329 |

OTHER PUBLICATIONS

The English translation of the International Search for the corresponding International Patent Application No. PCT/EP2024/025193 (2 pages); dated Sep. 20, 2024.
The German Patent Office—Office Action in the German language for the corresponding priority German patent application No. 10 2023 119 250.7; dated Jun. 6, 2024; 14 pages.

* cited by examiner

FAN WHEEL

CROSS-REFERENCE TO RELATED APPLICATIONS

This is a continuation-in-part application of pending international patent application PCT/EP2024/025193 filed Jul. 1, 2024 and claiming the priority of German patent application No. 10 2023 119 250.7 filed Jul. 20, 2023. Both the said international patent application PCT/EP2024/025193 and the said German patent application No. 10 2023 119 250.7 are incorporated herein by reference in their entireties as though fully set forth.

BACKGROUND OF THE INVENTION

The invention resides in a fan wheel with fan blades which are supported in a hub so as to be pivotable about the longitudinal fan blade axes in accordance with the claims.

WO 2021/121648 A1 discloses a fan wheel with adjustable fan blades which are connected via a planetary transmission with an adjustment ring and which are rotatably supported in a hub so as to be rotatable about the blade axes. The fan wheel is driven via a drive flange which can be coupled to a drive motor. The adjustment ring includes a guide track into which a guide bolt extends that is connected to the hub. On the drive flange a sun wheel of the planetary transmission is supported which is in engagement with planetary wheels which are supported on a control ring that is connected to a planetary wheel carrier. For reversing the blade position, the drive speed is reduced whereupon, as a result of inertia forces, the guide bolt moves in the guide track to an opposite stop position and the fan blades are pivoted to the desired angular position. The movement of the guide bolt in the guide track is slowed down by the planetary transmission.

It is the object of the present invention to provide with simple design features in a compact arrangement a fan wheel with pivotally supported fan blades in such a way that, during the fan blade reversing procedure, high design component stresses are avoided.

SUMMARY OF THE INVENTION

The object is achieved by the features of the claims.

The fan wheel according to the invention is used for example in construction or agricultural machines. It is particularly advantageous for a reversal of the position of fan blades which are supported on a hub so that they are pivotable about the longitudinal fan blade axes. Upon reversal of the pivot position of the fan blades the air movement direction of the fan wheel is reversed from an air supply mode to a fan wheel cleaning mode for removing dust and dirt deposits from the fan wheel.

The fan wheel includes a drive flange which is connected to the hub via a limited free-wheeling structure which permits an adjustment of the angular position of the fan blades with respect to the hub. The fan wheel is driven via a drive flange which can be coupled to a drive motor.

The fan wheel includes a planetary transmission which is arranged between the drive flange and the fan blades. An adjustment member which is driven by the planetary transmission is supported opposite the hub in such a way that the adjustment member can execute within the free-wheeling range only a limited rotational relative movement with respect to the hub. When the adjustment member moves relative to the hub within the constriction of the free wheeling range, the desired change of the angular position of the fan blades is achieved. Each of the two end positions of the free-wheeling range marks a stable position of the fan wheel blades. These positions are in particular the blowing position which is the standard position for moving air and the opposite cleaning position with a reversal of the air flow direction for cleaning the fan wheel. With the planetary transmission the relative rotational movement between the adjustment member and the hub within the free-wheeling range for the reversal of the angular position of the fan blades occurs at a slowed speed so that the design component stresses are reduced and, in particular, high impact forces upon reaching the end positions are avoided.

The fan wheel can be driven only in one rotational direction. It is not necessary to reverse the direction of rotation of the fan wheel in order to obtain a change of the angular position of the fan wheel blades. Rather, by a change of the drive speed of the fan wheel, a relative rotational movement between the adjustment member and the hub which supports the pivotally supported fan blades is obtained because of the inertia of the fan wheel blades including the hub. As a result of the relative movement, the adjustment member changes the annular position of the fan wheel blades. For example, by a speed reduction of at least a certain minimum value, the fan wheel blades are moved from the air blowing position to the cleaning position and by a speed increase with a certain minimum acceleration value, the fan wheel blades are moved from the cleaning position to the blowing position.

In the fan wheel according to the invention, the sun gear of the planetary transmission connected to the drive flange for rotation wherewith is arranged at an axial front end side or face of the fan wheel whereas the drive flange is arranged at the opposite axial front end side or face of the fan wheel. Hereby the toothing of the sun gear by which the sun gear is in engagement with the planetary gear is arranged axially spaced from the drive flange.

This arrangement has the advantage that the sun gear can be formed independent of the drive flange and, in particular, the gear area of the sun gear is independent of the dimensions of the drive flange. The sun gear is not supported by the drive flange but is arranged at the one axial front end side of the fan wheel with a component connected to the drive flange which permits the use of a smaller sun gear with a corresponding smaller number of teeth. Accordingly, a transmission ratio in the planetary transmission can be provided by the desired slowed movement in the free-wheeling process and an increased adjustment torque is obtained.

The sun gear of the planetary transmission is in engagement with planetary gears supported on a planetary gear carrier so that the planetary gears revolve along the toothed inside of a hollow wheel. The sun gear, the planetary gear carrier and the hollow wheel are arranged coaxially with the drive flange and arranged advantageously all on the same axial side of the fan wheel opposite the drive flange. In this way, the components of the planetary transmission and the drive flange can be independent of one another which increases the flexibility concerning the design features of the fan wheel.

In an advantageous embodiment the sun gear has a smaller outer diameter than the outer diameter of the drive flange. This permits the provision of large transmission ratios so that a high drive speed is converted to a small rotational adjustment movement of the adjustment member with a high adjustment torque.

In another advantageous embodiment, the adjustment member is formed by the planetary gear carrier of the planetary transmission. This eliminates the need for a separate adjustment member, which reduces the required component space. In an alternative embodiment the adjustment member and the planet carrier can be components which are independent from one another but are rotatably interconnected. The adjustment member may for example be in the form of an adjustment ring.

In accordance with still another advantageous embodiment, the adjustment member is provided with a gear structure and is in engagement with a pinion which is arranged on the foot of a fan blade which blade foot is pivotally supported in the hub. The fan blade pinion is for example in the form of a conical pinion. Upon a rotational movement of the adjustment member within the free-wheeling range the blade pinion is rotated causing a pivotal movement of the fan blade.

The free-wheeling structure preferably comprises a guide bolt which is connected directly or indirectly for rotation with the drive flange and a curved guide path provided in the hub into which the guide bolt extends for adjustment movement along the guide path. The opposite front ends of the guide path represent the end positions which are the blowing position and the cleaning position of the fan blades. The guide path is in the form of a circular axis which extends advantageously over an angular segment of more than 90° (degrees), in particular more than 120°, and preferably at least 150°. The relatively large length of the guide path facilitates a precise adjustment of the angular position of the fan blades.

In an advantageous embodiment, two relative to the longitudinal axis mirror-reversed guide tracks are provided in the hub and a guide bolt extends into each guide track. This is advantageous to provide two guide tracks so as to evenly divide the forces and avoid tilting torques and also to divide the drive moments.

It may be expedient to provide at the opposite ends of each guide track a damping member. The damping members may be for example rubber bumpers which dampen the impact of the guide bolts at the ends of the guide paths during the change-over from one end position to the opposite end position.

In another advantageous embodiment the drive flange is firmly connected to a main shaft which carries the hub. The drive flange and the main shaft are two separate coaxially arranged components which are joined together but can be designed and manufactured independently. The main shaft is arranged axially between the drive flange and the sun gear of the planetary transmission which is connected to the main shaft for rotation therewith.

In accordance with a further advantageous embodiment, a hollow wheel of the planetary transmission, in which the planetary gears roll around, is connected to the hub for rotation therewith. The sun gear, the hollow wheel and the planetary gears and also the planetary gear carrier are all arranged at the same axial front side of the fan wheel at an axial distance from the drive flange. It may be expedient to cover the gears of the planetary transmission with a transmission lid which may be retained for example on the axially outer side of the hollow wheel.

Further advantages and expedient embodiments are apparent from the claims, the detailed description of the invention, and the drawings.

BRIEF DESCRIPTION OF THE DRAWINGS

It is shown in.

In the figures identical components are designated by the same reference numerals.

DETAILED DESCRIPTION OF THE INVENTION

Figure 1:
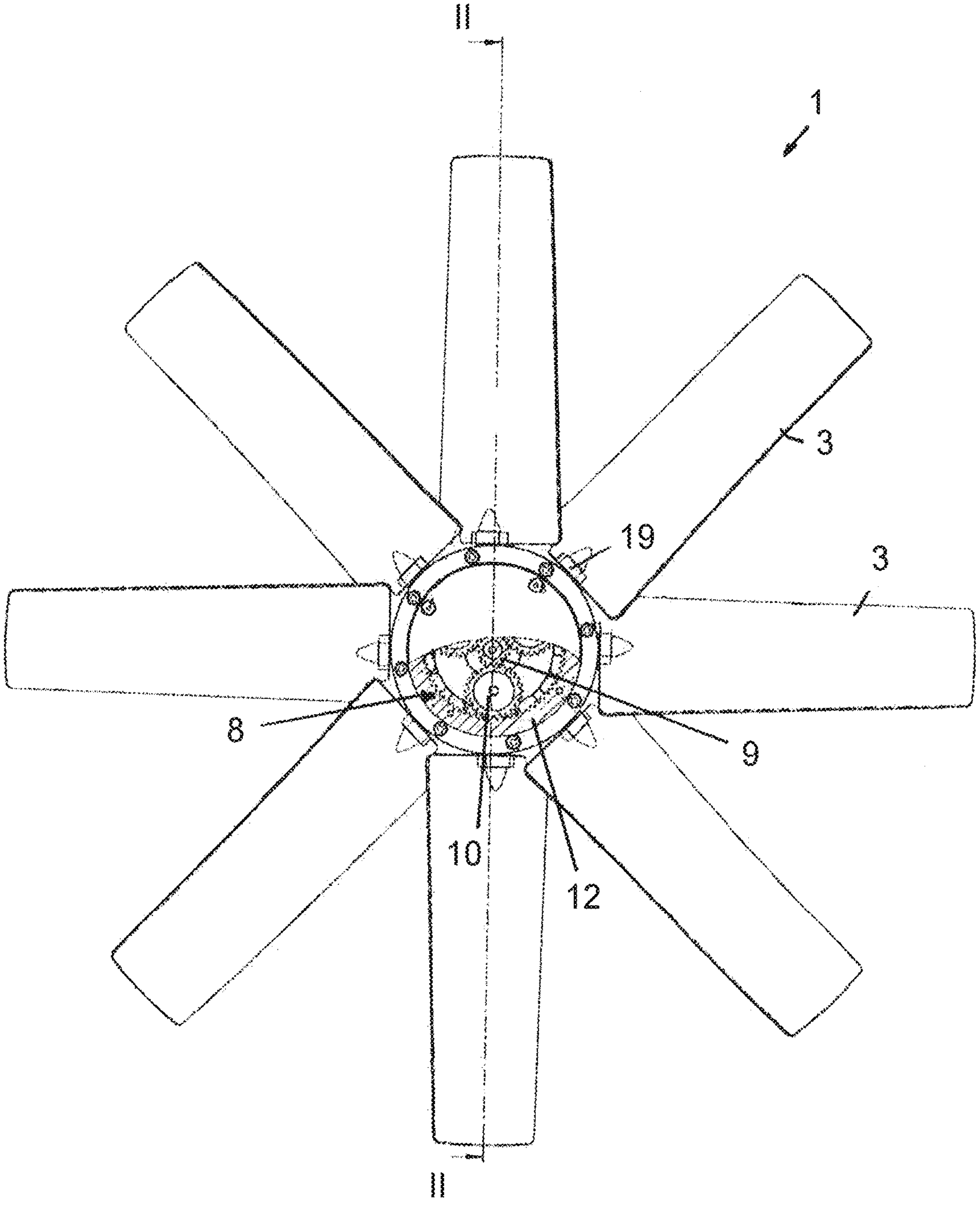
FIG. 1 a front view of a fan wheel with adjustable fan blades.
Figure 2:
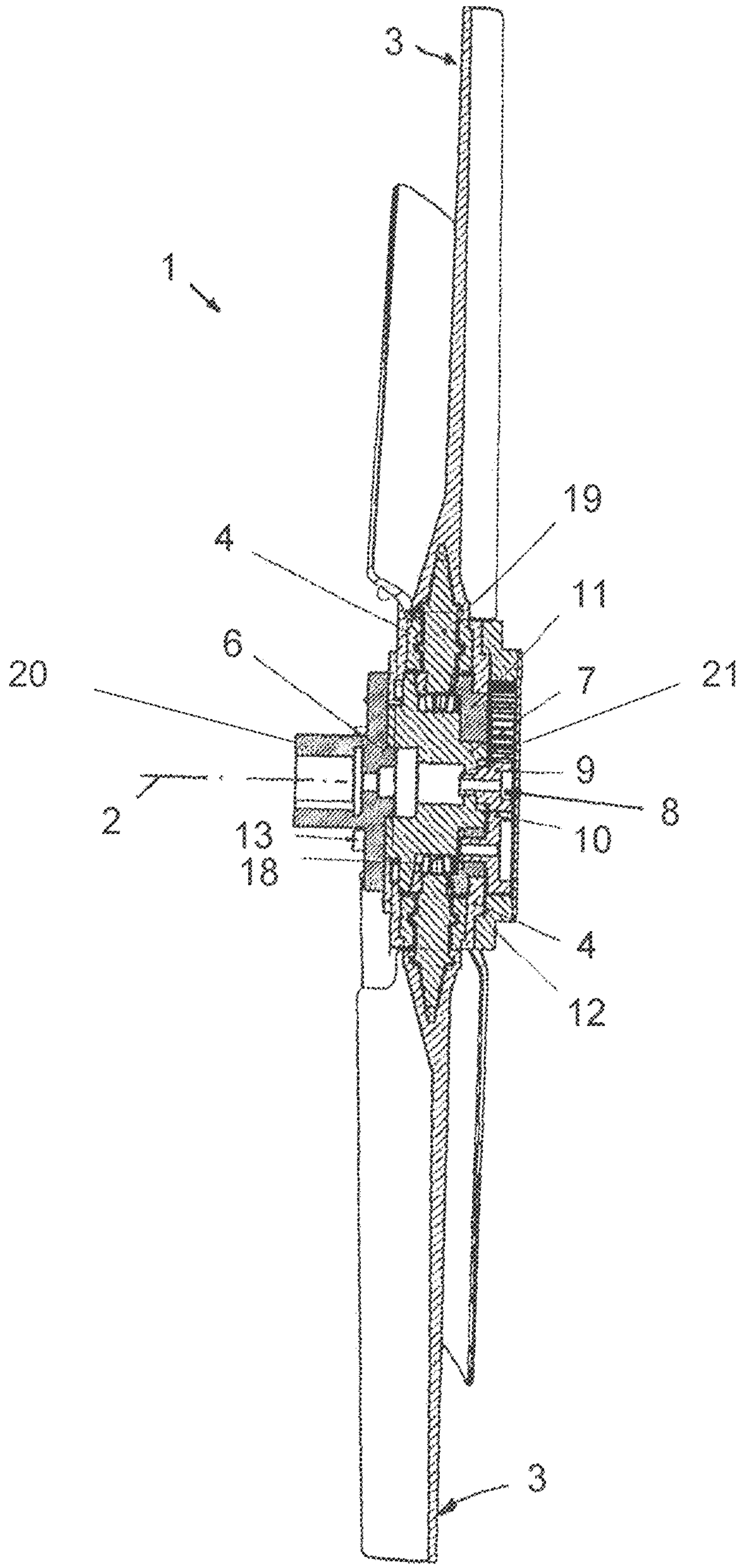
FIG. 2 a cross-sectional representation of the fan wheel taken along line II-II of FIG. 1, FIG. 3 an enlarged representation of the cross-sectional representation of FIG. 2, FIG. 4 a cross-sectional of the hub transverse to the longitudinal and drive shaft axis of the fan wheel according to line IV-IV of FIG. 3.
Figure 3:
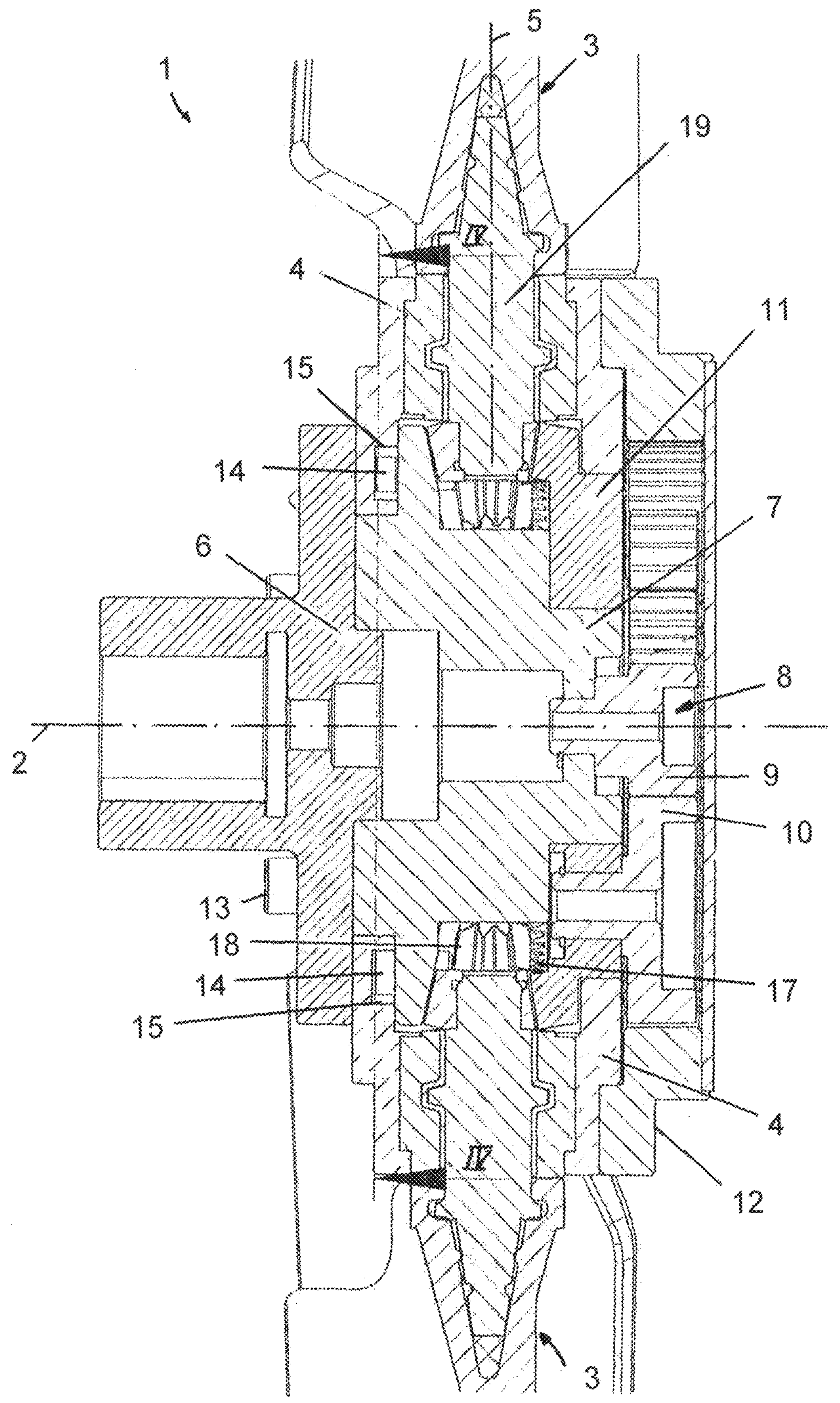

The fan wheel 1 can be driven for rotation about its longitudinal axis 2 which is also the drive axis (FIG. 2, FIG. 3). It includes, distributed over the circumference, fan blades 3 which extend radially from the longitudinal axis 2. The fan blades 3 are pivotally supported in a hub 4 so as to be pivotable about their longitudinal axis 5, in particular by close to 180°, between two end positions which correspond to an air blowing mode and a cleaning mode. The position of the blades corresponding to the air blowing mode represents the standard position, in which an air flow is generated by the rotating fan wheel 1. The cleaning mode position is taken by the fan blades 3 only for short periods in order to reverse the air flow direction of the fan to remove dust and dirt from the fan blades.

The fan wheel 1 comprises further a drive flange 6, a main shaft 7 and a planetary transmission 8 which includes a sun gear 9, planetary gears 10 supported on a planetary gear carrier 11 and a hollow wheel 12. These components are arranged co-axially with respect to the longitudinal drive axis 2 that is, as far as the planetary gears 10 are concerned, they revolve around the longitudinal drive axis 2. The drive flange 6 is driven by a drive arrangement, in particular, by an electric motor or a hydraulic motor, not shown in the drawings. The drive motor operates exclusively in one direction of rotation. Also, during a change of the air blowing mode to the cleaning mode the direction of rotation of the fan wheel is not changed.

Figure 4:
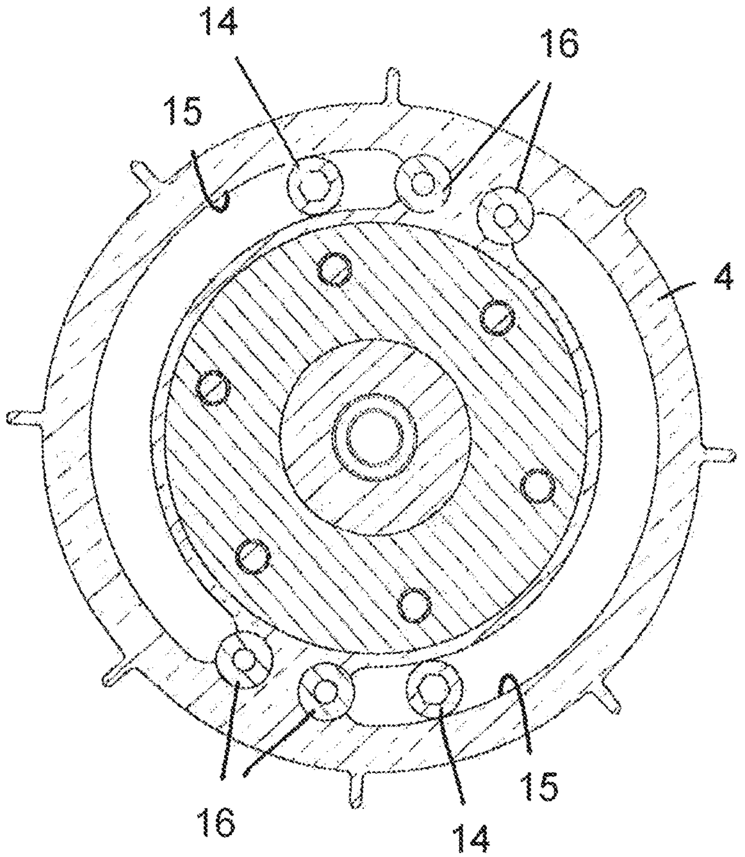

The drive flange 6 comprises a hollow cylindrical flange section for a coupling with the drive arrangement. Adjacent to the hollow cylindrical flange section there is a shoulder ring of relatively large radial extension which is connected to the main shaft 7 by connecting screws 13 for rotation with the main shaft 7. The main shaft 7 supports the hub 4 that is seated radially outside on the main shaft 7 in such a way that the hub can rotate relative to the main shaft 7 and the drive flange 6 within the limits of a free-wheeling arrangement. The free-wheeling arrangement is formed by a guide bolt 14 and a circular arc-shaped guide track 15 which is provided in the hub 4 concentrically with the longitudinal drive axis 2 (FIG. 3, FIG. 4) and which extends over an angular segment of close to 180° of the circular arc-shaped guide track. For a uniform force distribution, the hub 4 has two guide tracks 15 which are mirror-reversed relative to the longitudinal drive axis 2 and into each of which a guide bolt 14 extends. At each end of each guide track 15 there is a damping body 16 in the form of a rubber buffer which dampens the impact of the guide bolt 14 during an adjustment movement between air movement modes and cleaning modes.

The drive flange 6 and the planetary transmission 8 are arranged at axially opposite sides of the main shaft 7. The sun gear 9 of the planetary transmission 8 is connected to the main shaft 7 for rotation therewith and is also coupled to the drive flange 6 for rotation therewith. The gear structure of the sun gear 9 is axially spaced from the main shaft 7 and consequently also from the drive flange 6. The sun gear 9 has a smaller outer diameter than the drive flange 6 in the area of the hollow cylindrical flange section and also the shoulder ring.

The sun gear 9 is in engagement with the planetary gears 10 of the planetary gear carrier which is rotatably supported on a shoulder of the main shaft 7. The planetary gears 10 are at the radially outer side in engagement with the internal gear structure of the hollow wheel 12 which abuts the hub 4 and is connected to the hub 4 for rotation therewith. The planetary gear carrier 11 forms an annular control member for the angular adjustment of the fan blades 3. To this end, the planetary gear carrier 11 is provided at the side facing the drive flange 6 with a side gear structure 17, in particular a cone gear structure which is in engagement with a conical pinion 18 which is provided at a radially inner side of a shaft foot 19 of each fan blade. The shaft foot 19 is rotatably supported in the hub 4 and facilitates rotation of the fan blades 3 about the longitudinal blade axis 5.

For an adjustment of the fan blades 3 from an air blowing mode to the cleaning mode the drive speed of the fan wheel 1 is reduced in such a way that a certain minimum speed reduction is obtained. Because of the inertia, the fan blades 3 are trying to maintain their original speed which results in a relative movement between the drive flange 6 or, respectively, the main shaft 7 and the hub 4. As a result, the guide bolt 14 which is connected to the main shaft 7 is moved in the guide track 15 formed in the hub 4 toward the opposite end stop position. The relative movement between the drive flange 6 or the main shaft 7 results in a change of the angular position of the fan blade 3 about the respective blade longitudinal axis 5 without reversal of the direction of rotation of the fan wheel 1.

The adjustment of the fan blades 3 about the longitudinal blade axis 5 occurs based on the coupling with the planetary transmission 8 not in a sudden burst but at a reduced speed which depends on the transmission ratio of the planetary transmission. As a result of the rigid coupling of the sun gear 9 with the main shaft 7 and the drive flange 6 the speed reduction of the drive affects directly also the sun gear 9 as well as the other gears of the planetary transmission 8. As a result, the planetary carrier 11 with the gear structure 17 rotates relative to the blade pinion 18 and the shaft foot 19 with the fan blade 3 is rotated about the longitudinal blade axis.

For the adjustment of the fan blade 3 in the opposite direction, that is from the cleaning mode to the blowing mode, the drive speed of the fan wheel 1 is increased in such a way that a minimum deceleration value is reached. Also in this adjustment movement, the fan blades 3 tend to maintain their original speed because of inertia forces which again results in a relative movement between the drive flange 6 or, respectively the main shaft 7 and the hub 4 whereby the guide bolt 14 is moved in the guide track 15 toward the opposite original position. The fan blades 3 are moved again to their original position which corresponds to the air blowing mode, wherein the adjustment movement of the fan blades 3 occurs as a result of the coupling with the planetary transmission 8 also at a reduced speed.

LISTING OF REFERENCE NUMERALS

1 fan wheel
2 longitudinal drive axis
3 fan blade
4 hub
5 longitudinal blade axis
6 drive flange
7 main shaft
8 planetary transmission
9 sun gear
10 planetary gear
11 planetary gear carrier
12 hollow wheel
13 connecting screw
14 guide bolt
15 guide track
16 damping member
17 side gear structure
18 conical blade pinion
19 shaft foot
20 axial front end side or face of fan wheel
21 opposite axial front end side or face of fan wheel

What is claimed is:

1. A fan wheel (1) that can be driven in only one direction of rotation, the fan wheel (1) including:

fan blades (3), each fan blade (3) pivotably mounted in a hub (4) about a blade longitudinal axis (5), a drive flange (6) connected to the hub (4) via a limited free-wheeling structure, the drive flange (6) can be coupled to a drive motor to drive the fan wheel (1), a planetary transmission (8) in operative arrangement between the drive flange (6) and the fan blades (3), an actuating adjusting body (11) driven by the planetary transmission (8) mounted relative to the hub (4) such that the actuating adjusting body (11) can carry out a limited relative rotational movement relative to the hub (4) superimposed on a rotary drive movement of the hub (4) in a limited free-wheeling range of the free-wheeling structure, the actuating adjusting body (11) configured for adjusting an angular position of the fan blades (3) during the limited relative rotational movement, characterized by a sun gear (9) of the planetary transmission (8) connected in a rotationally fixed manner to the drive flange (6), the sun gear (9) and the drive flange (6) are arranged on axially opposite end faces of the fan wheel (1), wherein a toothing of the sun gear (9), with which the sun gear (9) meshes with planetary gears (10) of the planetary transmission (8), is arranged axially spaced from the drive flange (6).

2. The fan wheel according to claim 1, wherein the sun gear (9) has a smaller outer diameter than the drive flange (6).

3. The fan wheel according to claim 1, wherein the actuating adjusting body (11) is formed by a planetary gear carrier (11) of the planetary transmission (8).

4. The fan wheel according to claim 1, wherein the actuating adjusting body (11) has a toothing side gear structure (17) that meshes with a conical blade pinion (18) that is arranged on a shaft foot (19) of each of the fan blades (3).

5. The fan wheel according to claim 1, wherein the free-wheeling structure includes a guide bolt (14) which is connected to the drive flange (6) in a rotationally fixed manner and an arcuate guide track (15) provided in the hub (4), the guide bolt (14) protruding into the guide track (15) in operative arrangement therewith.

6. The fan wheel according to claim 5, wherein the guide track (15) in the hub extends over an angular segment greater than 90°.

7. The fan wheel according to claim 6, wherein the guide track (15) in the hub extends over an angular segment greater than 120°.

8. The fan wheel according to claim 7, wherein the guide track (15) in the hub extends over an angular segment at least 150°.

9. The fan wheel according to claim 5, wherein the free-wheeling structure further includes a damping body (16) operatively arranged at each end of the guide track (15).

10. The fan wheel according to claim 5, wherein the hub (4) has two guide tracks (15) arranged mirror-reversed to a unitary longitudinal and drive axis (2), with a corresponding guide bolt (14) protruding into each guide track (15).

11. The fan wheel according to claim 1, wherein the drive flange (6) is connected in a rotationally fixed manner to a main shaft (7) which supports the hub (4).

12. The fan wheel according to claim 11, wherein the sun gear (9) is axially adjacent to the main shaft (7) and is connected to the main shaft (7).

13. The fan wheel according to claim 1, wherein a ring gear (12) of the planetary transmission (8), in which the planetary gears (10) roll, is connected in a rotationally fixed manner to the hub (4).

* * * * *